United States Patent
Seong et al.

(10) Patent No.: US 8,350,978 B2
(45) Date of Patent: Jan. 8, 2013

(54) LIQUID CRYSTAL DISPLAY

(75) Inventors: Seok-Je Seong, Yongin (KR); Ji-Eun Lee, Yongin (KR)

(73) Assignee: Samsung Display Co., Ltd (KR)

( * ) Notice: Subject to any disclaimer, the term of this patent is extended or adjusted under 35 U.S.C. 154(b) by 124 days.

(21) Appl. No.: 13/087,312

(22) Filed: Apr. 14, 2011

(65) Prior Publication Data

US 2012/0147285 A1 Jun. 14, 2012

(30) Foreign Application Priority Data

Dec. 13, 2010 (KR) ........................ 10-2010-0126984

(51) Int. Cl.
*G02F 1/1368* (2006.01)
(52) U.S. Cl. ............. 349/43; 349/38; 349/143; 349/144
(58) Field of Classification Search ..................... 349/38, 349/39, 42, 43, 48, 143, 144, 146; 257/59, 257/72; 345/92
See application file for complete search history.

(56) References Cited

U.S. PATENT DOCUMENTS

| | | | | |
|---|---|---|---|---|
| 5,757,444 A | * | 5/1998 | Takemura | ........................ 349/38 |
| 2007/0296898 A1 | * | 12/2007 | Cho et al. | ..................... 349/139 |
| 2008/0062370 A1 | * | 3/2008 | Park | .............................. 349/144 |
| 2008/0117373 A1 | * | 5/2008 | Sohn et al. | ..................... 349/143 |
| 2010/0277447 A1 | * | 11/2010 | Itoh et al. | ....................... 345/205 |

FOREIGN PATENT DOCUMENTS

| | | |
|---|---|---|
| KR | 10-2006-0031498 A | 4/2006 |
| KR | 10-2007-0000529 A | 1/2007 |
| KR | 10-2007-0070911 A | 7/2007 |
| KR | 10-2008-0038599 A | 5/2008 |

* cited by examiner

*Primary Examiner* — Bung Nguyen
*Assistant Examiner* — Tai Duong
(74) *Attorney, Agent, or Firm* — Knobbe Martens Olson & Bear, LLP.

(57) ABSTRACT

An LCD includes: a first substrate; first, second, and third gate lines extending along a first direction, formed over the first substrate and being parallel with each other; data lines insulated from the first gate line, the second gate line, and the third gate line and extending along a second direction that intersects the first direction; first, second, and third thin film transistors connected with the first gate lines, the second gate line, the third gate line, respectively and connected with the data lines; a passivation layer covering the first thin film transistor, the second thin film transistor, and the third thin film transistor; and first, second, and third pixel electrodes formed over the passivation layer and connected with the first thin film transistor, the second thin film transistor, and the third thin film transistor, respectively.

16 Claims, 2 Drawing Sheets

LIQUID CRYSTAL DISPLAY

RELATED APPLICATIONS

This application claims priority to and the benefit of Korean Patent Application No. 10-2010-0126984 filed in the Korean Intellectual Property Office on Dec. 13, 2010, the entire contents of which are incorporated herein by reference.

BACKGROUND

1. Field

The described technology relates generally to a liquid crystal display (LCD).

2. Description of the Related Art

A liquid crystal display (LCD) is one of the most commonly used flat panel displays, and it includes two substrates with electrodes formed thereon and a liquid crystal layer interposed between the two substrates. In the LCD, a voltage is applied to the electrodes to realign liquid crystal molecules of the liquid crystal layer to thereby regulate the transmittance of light passing through the liquid crystal layer.

The liquid crystal display also includes a switching element connected to each pixel electrode and a plurality of signal lines including gate lines and data lines for applying the voltage to the pixel electrode by controlling the switching element. The gate line transmits a gate signal generated from a gate driving circuit, the data line transmits a data voltage generated from a data driving circuit, and a switch transmits the data voltage to the pixel electrode according to the gate signal. an LCD has a triple gate structure in which the gate driver is formed through the same process of the switch and then integrated to the substrate. The pixels are arranged in a direction such that the number of gate lines is tripled but the number of data lines is maintained to be ⅓ of the number of the gate lines. Thus, the same resolution is realized with reduced costs.

Meanwhile, an organic layer structure in which a thick organic layer covers the data line is applied to improve the aperture ratio, but the aperture ratio is not significantly improved even though the organic layer structure is applied to the LCD having the triple gate structure. Since the gate line is formed on the same layer of the storage electrode line, the gate line should have a gap with the storage electrode line, and an additional storage electrode is required to assure storage capacity in the organic layer structure so that the aperture ratio is decreased. Further, since the gate line and the source electrode have a large overlapped area, the gap between a gate line and the pixel electrode should be increased to reduce a kickback voltage due to parasitic capacitance between the gate electrode and the source electrode such that the aperture ratio is decreased.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a liquid crystal display (LCD) with improved aperture ratio.

An LCD according to an embodiment includes: a first substrate; first, second, and third gate lines extending along a first direction, formed over the first substrate and being parallel with each other; data lines insulated from the first gate line, the second gate line, and the third gate line and extending along a second direction that intersects the first direction; first, second, and third thin film transistors connected with the first gate lines, the second gate line, the third gate line, respectively, and connected with the data lines; a passivation layer covering the first thin film transistor, the second thin film transistor, and the third thin film transistor; and first, second, and third pixel electrodes formed over the passivation layer and connected with the first thin film transistor, the second thin film transistor, and the third thin film transistor, respectively. The first gate line extends through a middle portion of the second pixel electrode along the first direction when viewed from a viewing direction perpendicular to the first substrate.

The LCD may further include at least one storage electrode line formed on the same layer where the first, second, and third gate lines are formed.

The first gate line, the second gate line, and the third gate line may be sequentially arranged along the second direction, and the first gate line, the second gate line, and the third gate line may form one gate line group.

The at least one storage electrode line may include: a first storage electrode line disposed between a third gate line of a previous gate line group and a first gate line of the present gate line group; a second storage electrode line disposed between the first gate line and a second line of the present gate line group; and a third storage electrode line disposed between the second gate line and a third gate line of the present gate line group.

The first thin film transistor may be disposed between the first storage electrode line and the first gate line, the second thin film transistor may be disposed between the second storage electrode line and the second gate line, and the third thin film transistor may be disposed between the third storage electrode line and the third gate line.

The first storage electrode line, the second storage electrode line, and the third storage electrode line may be sequentially arranged in the second direction, and the first storage electrode line, the second storage electrode line, and the third storage electrode line may form one storage electrode line group.

The first pixel electrode may be disposed between a third storage electrode line of a previous storage electrode line group and a first storage electrode line of the present storage electrode line group, the second pixel electrode may be disposed between the first storage electrode line and the second storage electrode line of the present storage electrode line group, and the third pixel electrode may be disposed between the second storage electrode line and the third storage electrode line of the present storage electrode line group.

Each of the first pixel electrode, the second pixel electrode, and the third pixel electrode may include a plurality of sub-pixel electrodes.

The at least one storage electrode line may include at least an extended storage portion disposed between two neighboring two sub-pixel electrodes.

The LCD may further include at least one overlapping electrode formed in the same layer of the data line and overlapping the at least one storage electrode line.

The at least one overlapping electrode may include at least one extended overlapping portion disposed between two neighboring sub-pixel electrodes.

The first thin film transistor may include a first gate electrode connected with the first gate line, a first source electrode connected with the data line, and a first drain electrode connected with the first pixel electrode, the second thin film transistor may include a second gate electrode connected with the second gate line, a second source electrode connected with the data line, and a second drain electrode connected with the second pixel electrode, and the third thin film transistor may include a third gate electrode connected with the third gate line, a third source electrode connected with the data line, and a third drain electrode connected with the third pixel electrode.

The at least one overlapping electrode may include: a first overlapping electrode connected with the first drain electrode; a second overlapping electrode connected with the second drain electrode; and a third overlapping electrode connected with the third drain electrode, and the first overlapping electrode, the second overlapping electrode, and the third overlapping electrode may be separated from each other.

The LCD may further include a gate insulating layer covering the gate line and the storage electrode line, and the passivation layer may include an organic layer.

The LCD may further include a color filter display panel including a second substrate arranged opposite to the first substrate and a common electrode formed on the second substrate and a liquid crystal layer inserted between the thin film transistor display panel and the color filter display panel.

The first direction may be perpendicular to the second direction.

According to the embodiments, in an LCD with a triple gate structure employing an organic layer structure, each of storage electrode lines are disposed between two neighboring pixel electrodes and between two neighboring gate lines which extend through middle portions of the two neighboring pixel electrodes, respectively. Thus, the aperture ratio can be improved.

Further, storage capacitors are disposed between a left-side sub-pixel electrode and a center sub-pixel electrode and between the center sub-pixel electrode and a right-side sub-pixel electrode such that the storage capacity can be improved while simultaneously improving the aperture ratio.

DETAILED DESCRIPTION

Figure 1:
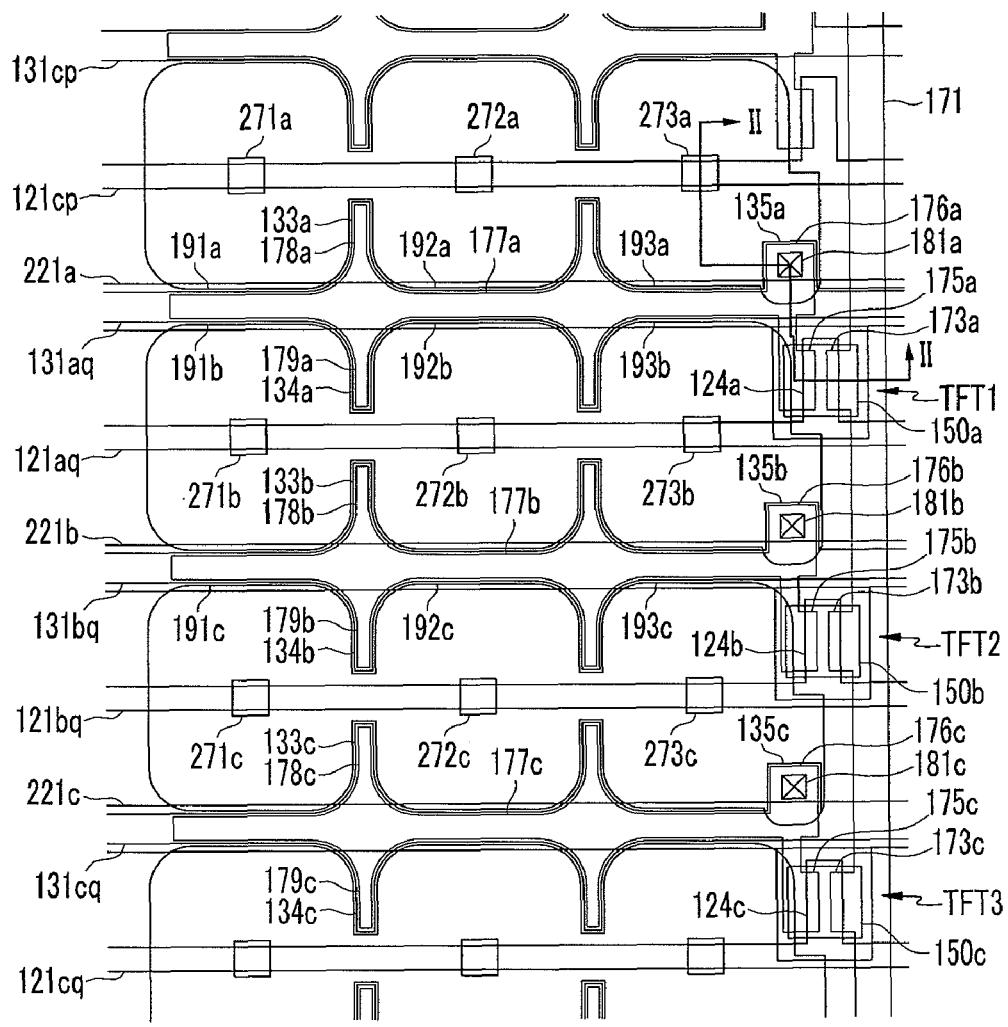
FIG. 1 is a layout view of three pixels adjacent to each other in a liquid crystal display (LCD) according to an embodiment.

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that when an element such as a layer, film, region, or substrate is referred to as being "on" another element, it can be directly on the other element or intervening elements may also be present.

Figure 2:
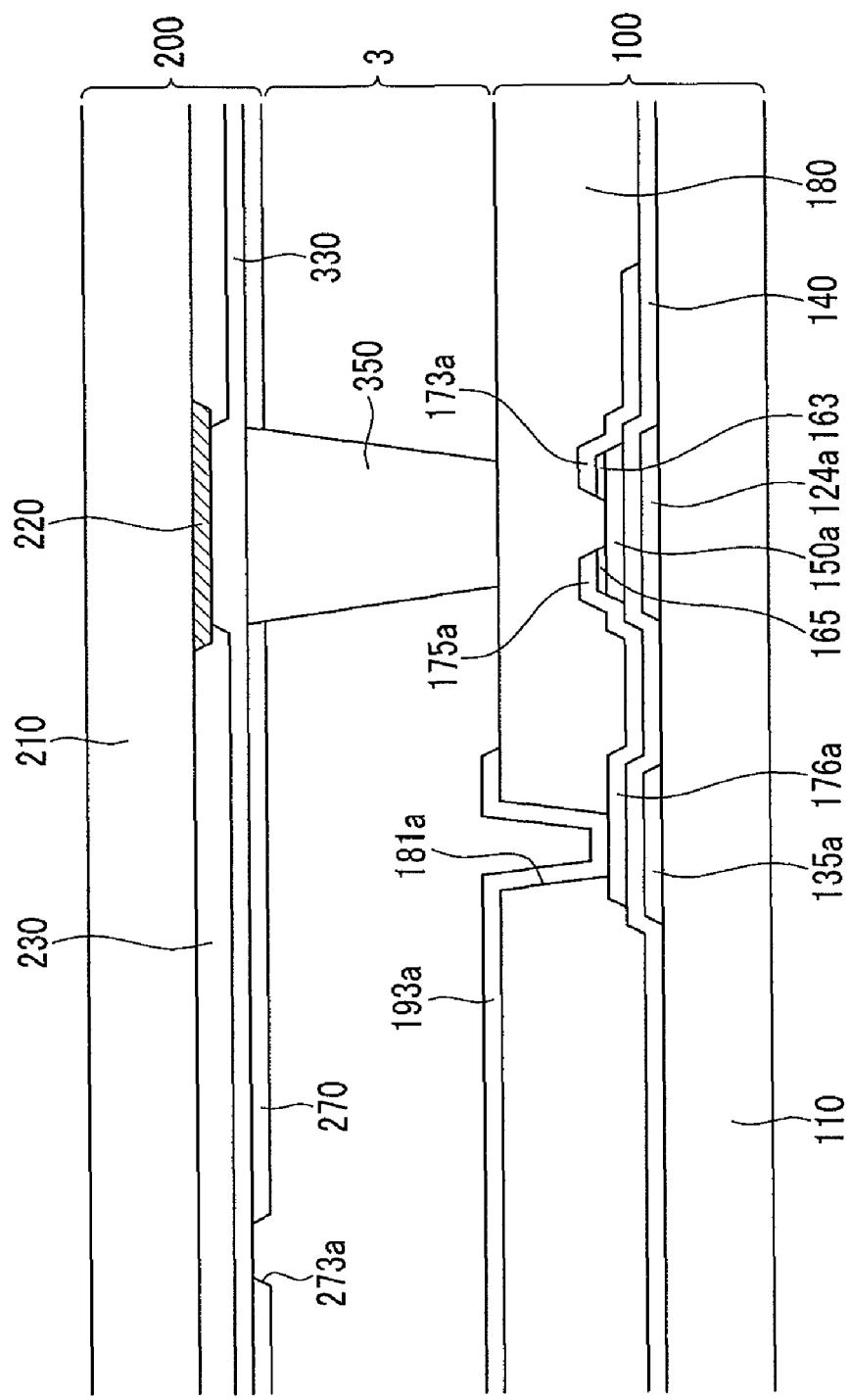
FIG. 2 is a cross-sectional view of the LCD of FIG. 1, taken along the line II-II.

Referring to FIGS. 1 and 2, a liquid crystal display (LCD) according to an embodiment will be described in further detail.

FIG. 1 is a layout view of three pixels adjacent to each other in the LCD according to the embodiment, and FIG. 2 is a cross-sectional view of the LCD of FIG. 1, taken along the line II-II.

As shown in FIG. 1 and FIG. 2, the LCD according to the embodiment includes a thin film transistor display panel 100, a color filter display panel 200 facing the thin film transistor display panel 100, and a liquid crystal layer 300 injected between the thin film transistor display panel 100 and the color filter display panel 200.

The thin film transistor display panel 100 includes a first substrate 110 formed with transparent glass or plastic, gate lines 121, and storage electrode lines 131. The gate lines 121 and the storage electrode lines 131 are formed on the first substrate 110.

The gate line 121 transmits a gate signal and substantially extends in a first direction, that is, a width direction of the drawing sheet. The gate lines 121 include a first gate line 121$aq$, a second gate line 121$bq$, and a third gate line 121$cq$ that are parallel with each other. The first, second, and third gate lines 121$aq$, 121$bq$, and 121$cq$ for receiving different gate signals are arranged in a second direction that sequentially crosses the first direction, that is, a length direction of the drawing sheet, and the three gate lines 121$aq$, 121$bq$, and 121$cq$ form a gate line group. With reference to the present gate line group, a gate line group arranged above the present gate line group is defined as a previous gate line group and a gate line group arranged below the present gate line group is defined as a next gate line group.

The first gate line 121$aq$, the second gate line 121$bq$, and the third gate line 121$cq$ respectively include a first gate electrode 124$a$, a second gate electrode 124$b$, and a third gate electrode 124$c$, respectively protruding upward.

The storage electrode line 131 receives a predetermined voltage, and extends in parallel with the gate line 121. The storage electrode lines 131 include a first storage electrode line 131$aq$ arranged between the third gate line 121$cp$ of the previous gate line group and the first gate line 121$aq$ of the present gate line group, a second storage electrode line 131$bq$ arranged between the first gate line 121$aq$ and the second gate line 121$bq$ of the present gate line group, and a third storage electrode line 131$cq$ arranged between the second gate line 121$bq$ and the third gate line 121$cq$ of the present gate line group.

The first storage electrode line 131$aq$, the second storage electrode line 131$bq$, and the third storage electrode line 131$cq$ are sequentially arranged in the second direction, and they form one storage electrode line group. With reference to the present storage electrode line group, a storage electrode line group arranged above the present storage electrode line group is defined as a previous storage electrode line group and a storage electrode line group arranged below the present storage electrode line group is defined as a next storage electrode line group.

The storage electrode line 131 includes extended storage portions 133, 134, and 135 for extending storage capacity, and the extended storage portions 133, 134, and 135 include an upper extended storage portion 133 extending upward in the storage electrode line 131, a lower extended storage portion 134 extended downward, and an overlapped extended storage portion 135 overlapping with a wide end portion of the drain electrode 175. In the present embodiment, two upper extended storage portions 133 and two extended storage portions 134, and one overlapped extended storage portion 135 are formed.

The extended storage portions 133, 134, and 135 respectively include a first upper extended storage portion 133a extended from the first storage electrode line 131aq, a first lower extended storage portion 134a, a first overlapped extended storage portion 135a, a second upper extended storage portion 133b extended from the second storage electrode line 131bq, a second lower extended storage portion 134b, a second overlapped extended storage portion 135b, a third upper extended storage portion 133c extended from the third storage electrode line 131cq, a third lower extended storage portion 134b, and a third overlapped extended storage portion 135c.

A gate insulating layer 140 formed with silicon nitride (SiNx) or silicon oxide (SiOx) is formed on the first gate line 121aq, the second gate line 121bq, the third gate line 121cq, the first storage electrode line 131aq, the second storage electrode line 131bq, and the third storage electrode line 131cq.

A semiconductor layer 150 including amorphous silicon (a-Si) is formed on the gate insulating layer 140. The semiconductor layers 150 includes a first semiconductor layer 150a overlapping with the first gate electrode 124a, a second semiconductor layer 150b overlapping with the second gate electrode 124b, and a third semiconductor layer 150c overlapping with the third gate electrode 124c. Ohmic contact members 163 and 165 are formed on the semiconductor layer 150. The ohmic contact members 163 and 165 may be formed with a material such as n+ hydrogenated amorphous silicon doped with an n-type impurity such as phosphorous at high concentration, or may be formed with silicide. The ohmic contact members 163 and 165 are disposed on the semiconductor layer 150 as a pair.

On the ohmic contact members 163 and 165 and gate insulating layer 140, data lines 171 and drain electrodes 175 are formed, and the drain electrodes include a first drain electrode 175a, a second drain electrode 175b, and a third drain electrode 175c.

The data line 171 transmits a data signal, and substantially extends to a second direction such that it crosses the first gate line 121aq, the second gate line 121bq, and the third gate line 121cq. The data line 171 crosses the first storage electrode line 131aq, the second storage electrode line 131bq, and the third storage electrode line 131cq. The data line 171 includes a source electrode 173 extending toward the gate electrode 124, and the source electrode 173 includes a first source electrode 173a extending toward the first gate electrode 124a, a second source electrode 173b extending toward the second gate electrode 124b, and a third source electrode 173c extending toward the third gate electrode 124c.

The first drain electrode 175a, the second drain electrode 175b, and the third drain electrode 175c are separated with the data line 171, and the first drain electrode 175a faces the first source electrode 173a, centering the first gate electrode 124a therebetween, the second drain electrode 175b faces the second source electrode 173b, centering the second gate electrode 124b therebetween, and the third drain electrode 175c faces the third source electrode 173c, centering the third gate electrode 124c therebetween.

The drain electrode 175 includes a drain extending portion 176, that is, a wide one end portion, and an overlapping electrode 177 extends from the drain extending portion 176. The drain extending portion 176 overlaps with the extended storage portion 135 of the storage electrode line 131, and the overlapping electrode 177 has the same shape of the storage electrode line 131 and overlaps with the storage electrode line 131.

The overlapping electrodes 177 include a first overlapping electrode 177a connected with the first drain extending portion 176a of the first drain electrode 175a, a second overlapping electrode 177b connected with the second drain extending portion 176b of the second drain electrode 175b, and a third overlapping electrode 177c connected with the third drain extending portion 176c of the third drain electrode 175c. The first overlapping electrode 177a, the second overlapping electrode 177b, and the third overlapping electrode 177c are separated from each other.

The overlapping electrode 177 includes extended overlapping portions 178 and 179 overlapping the extended storage portions 133 and 134 to extend storage capacity, and the extended overlapping portion 178 includes an upper extended overlapping portion 178 extending upward from the overlapping electrode 177 and a lower extended overlapping portion 179 extending downward from overlapping electrode 177. In the present embodiment, two upper extended overlapping portions 178 and two lower extended overlapping portions 179.

The first gate electrode 124a, the first source electrode 173a, and the first drain electrode 175a form a first thin film transistor TFT1 with the first semiconductor layer 150a, and a channel of the first thin film transistor TFT1 is formed in a first semiconductor layer 150a between the first source electrode 173a and the first drain electrode 175a. Likely, a second thin film transistor TFT2 is formed of the second gate electrode 124b, the second source electrode 173b, the second drain electrode 175b, and the second semiconductor layer 150b, and a third thin film transistor TFT3 is formed of the third gate electrode 124c, the third source electrode 173c, the third drain electrode 175c, and the third semiconductor layer 150c.

The first thin film transistor TFT1 is disposed between the first storage electrode line 131aq and the first gate line 121aq, the second thin film transistor TFT2 is disposed between the second storage electrode line 131bq and the second gate line 121bq, and the third thin film transistor TFT3 is disposed between the third storage electrode line 131cq and the third gate line 121cq.

In addition, the first drain extending portion 176a, the second drain extending portion 176b, and the third drain extending portion 176c are respectively disposed adjacent to the first thin film transistor TFT1, the second thin film transistor TFT2, and the third thin film transistor TFT3. Thus, the first drain extending portion 176a and the first thin film transistor TFT1, the second drain extending portion 176a and the second thin film transistor TFT2, the third drain extending portion 176a and the third thin film transistor TFT3 that causes deterioration of the aperture ratio are respectively arranged at an outer portion of the first pixel electrode 190a, an outer portion of the second pixel electrode 190b, and an outer portion of the third pixel electrode 190c such that the aperture ratio can be improved.

The ohmic contact members 163 and 165 exist only between the semiconductor layer 150 and the source electrode 173 and the drain electrode 175 to decrease contact resistance therebetween.

A passivation layer 180 is formed on the data line 171, the drain electrode 175, and an exposed portion of the semiconductor layer 150. The passivation layer 180 is formed with an inorganic insulating material such as silicon nitride or silicon oxide, an organic insulating material, or a low dielectric constant insulating material. An organic insulating material having photosensitivity may be used to form the passivation layer 180, and the surface of the passivation layer 180 may be flat. However, the passivation layer 180 may have of a dual-layer structure in which an inorganic layer is a lower layer and an organic layer is an upper layer so that an excellent insulating characteristic of the organic layer is ensured while preventing the exposed semiconductor layer 150 from being damaged.

A contact hole 181 that exposes the drain electrode 175 is formed in the passivation layer 180, and a pixel electrode 190 is formed on the passivation layer 180. The contact hole 181 includes a first contact hole 181a exposing the first drain electrode 175a, a second contact hole 181b exposing the second drain electrode 175b, and a third contact hole 181c exposing the third drain electrode 175c.

The pixel electrodes 190 includes a first pixel electrode 190a disposed between the third storage electrode line 131cp of the previous storage electrode line group and the first storage electrode line 131aq of the present storage electrode line group, a second pixel electrode 190b disposed between the first storage electrode line 131aq and the second storage electrode line 131bq of the present storage electrode line group, and a third pixel electrode 190c disposed between the second storage electrode line 131bq and the third storage electrode line 131cq of the present storage electrode line group.

Thus, the third gate line 121cp of the previous gate line group crosses a center portion of the first pixel 190a in a row direction, the first gate line 121aq of the present gate line group crosses a center portion of the second pixel electrode 190b in a row direction, and the second gate line 121bq of the present gate line group crosses a center portion of the third pixel electrode 191c in a row direction.

As described, the first pixel electrode 190a, the second pixel electrode 190b, and the third pixel electrode 190c do not overlap with the first storage electrode line 131aq, the second storage electrode line 131bq, and the third storage electrode line 131cq so that the aperture ratio can be improved.

The first pixel electrode 190a includes three first sub-pixel electrodes. The three first sub-pixel electrodes 191a, 192a, and 193a are formed of a left-side first sub-pixel electrode 191a, a center first sub-pixel electrode 192a, and a right-side first sub-pixel electrode 193a.

A center portion of the left-side first sub-pixel electrode 191a corresponds to a left-side first cut-out portion 271a of the common electrode 270, a center portion of the center first sub-pixel electrode 192a corresponds to a center first cut-out portion 272a of the common electrode 270, and a center portion of the right-side first sub-pixel electrode 193a corresponds to a right-side first cut-out portion 273a of the common electrode 270.

Likely, the second pixel electrode 190b includes three second sub-pixel electrodes 191b, 192b, and 193b. The three second sub-pixel electrodes 191b, 192b, and 193b are formed of a left-side second sub-pixel electrode 191b, a center second sub-pixel electrode 191b, and a right-side second sub-pixel electrode 193b. A center portion of the left-side second sub-pixel electrode 191b corresponds to a left-side second cut-out portion 271b of the common electrode 270, a center portion of the center second sub-pixel electrode 191b corresponds to a center second cut-out portion 272b of the common electrode 270, and a center portion of the right-side second sub-pixel electrode 193b corresponds to a right-side second cut-out portion 273b of the common electrode 270. Further, the third pixel electrode 190c includes three third sub-pixel electrodes 191c, 192c, and 193c. The three third sub-pixel electrodes 191c, 192c, and 193c are formed of a left-side third sub-pixel electrode 191c, a center third sub-pixel electrode 192c, and right-side third sub-pixel electrode 193c. A center portion of the left-side third sub-pixel electrode 191c corresponds to a left-side third cut-out portion 271c of the common electrode 270, a center portion of the center third sub-pixel electrode 192c corresponds to a center third cut-out portion 272c of the common electrode 270, and a center portion of the right-side third sub-pixel electrode 193c corresponds to a right-side third cut-out portion 273c of the common electrode 270.

Thus, a periphery of each of the first sub-pixel electrodes 191a, 192a, and 193a forms a fringe field with the first cut-out portions 271a, 272a, and 273a of the common electrode 270, a periphery of each of the second sub-pixel electrodes 191b, 192b, and 193b forms a fringe field with the second cut-out portions 271b, 272b, and 273b of the common electrode 270, and a periphery of each of the third sub-pixel electrodes 191c, 192c, and 193c forms a fringe field with the third cut-out portions 271c, 272c, and 273c of the common electrode 270. Thus, wide angle view is realized.

The first pixel electrode 190a, the second pixel electrode 190b, and the third pixel electrode 190c may be formed with a transparent conductive material such as ITO or IZO or a reflective metal such as aluminum, silver or an alloy thereof.

The pixel electrode 190 is physically and electrically connected with the drain electrode 175 through the contact hole 182, and receives a data voltage from the drain electrode 175. Applied with the data voltage, the pixel electrode 190 generates an electric field with the common electrode 270 of the color filter display panel receiving a common voltage, thereby determining a direction of liquid crystal molecules of a liquid crystal layer 3 between the two electrodes. The pixel electrode 190 and the common electrode 270 form a capacitor (hereinafter, referred to as a liquid crystal capacitor) to maintain an applied voltage after the thin film transistor is turned off.

The overlapping electrode 177 is connected with the pixel electrode 190 through the drain electrode 175 and thus the overlapping electrode 177 and the storage electrode line 131 overlap with each other such that a storage capacitor is formed. The storage capacitor reinforces voltage storage capacitor of the liquid crystal capacitor.

The first upper extended storage portion 133a extended from the first storage electrode line 131aq is disposed between the left-side first sub-pixel electrode 191a and the center first sub-pixel electrode 192a and between the center first sub-pixel electrode 192a and the right-side first sub-pixel electrode 193a. The first lower extended storage portion 134a extended from the first storage electrode line 131aq is disposed between the left-side second sub-pixel electrode 191b and the center second sub-pixel electrode 191b and between the center second sub-pixel electrode 191b and the right-side second sub-pixel electrode 193b. In addition, the second upper extended storage portion 133b extended from the second storage electrode line 131bq is disposed between the left-side second sub-pixel electrode 191b and the center second sub-pixel electrode 191b and between the center second sub-pixel electrode 191b and the right-side second sub-pixel electrode 193b. The second lower extended storage portion 134b extended from the second storage electrode line 131bq is disposed between the left-side third sub-pixel electrode 191c and the center third sub-pixel electrode 192c and between the center third sub-pixel electrode 192c and the right-side third sub-pixel electrode 193c. In addition, the third upper extended storage portion 133c extended from the third storage electrode line 131cq is disposed between left-side third sub-pixel electrode 191c and the center third sub-pixel electrode 192c and between the center third sub-pixel electrode 192c and the right-side third sub-pixel electrode 193c.

Meanwhile, a first upper extended overlapping portion 178a extended from the first overlapping electrode 177a is disposed between the left-side first sub-pixel electrode 191a and the center first sub-pixel electrode 192a and between the center first sub-pixel electrode 192a and the right-side first sub-pixel electrode 193a. A first lower extended overlapping portion 179a extended from the first overlapping electrode 177a is disposed between the left-side second sub-pixel electrode 191b and the center second sub-pixel electrode 191b and between the center second sub-pixel electrode 191b and the right-side second sub-pixel electrode 193b. In addition, a second upper extended overlapping portion 178b extended from the second overlapping electrode 177b is disposed between the left-side second sub-pixel electrode 191b and the center second sub-pixel electrode 191b and between the center second sub-pixel electrode 191b and the right-side second sub-pixel electrode 193b. A second lower extended overlapping portion 179b extended from the second overlapping electrode 177b is disposed between the left-side third sub-pixel electrode 191c and the center third sub-pixel electrode 192c and between the center third sub-pixel electrode 192c and the right-side third sub-pixel electrode 193c. In addition, a third upper extended overlapping portion 178c extended from the third overlapping electrode 177c is disposed between the left-side third sub-pixel electrode 191c and the center third sub-pixel electrode 192c and between the center third sub-pixel electrode 192c and the right-side third sub-pixel electrode 193c.

As described, the storage electrode line 131 and the overlapping electrode 177 do not overlap with the pixel electrode 190 so that the aperture ratio can be improved. Further, the storage electrode line 131 and the overlapping electrode 177 respectively form the extended storage portions 133 and 134 and the extended overlapping portions 178 and 179 between the first sub-pixel electrodes 191a, 192a, and 193a, between the second sub-pixel electrodes 191b, 192b, and 193b, and between the third sub-pixel electrodes 191c, 192c, and 193c so that the overlapped area can be increased without forming an additional storage electrode such that the aperture ratio can be improved while simultaneously improving the aperture ratio.

In addition, since the storage capacity is improved, a kick-back voltage can be reduced.

The color filter display panel 200 facing the thin film transistor display panel 100 maintains a gap between the color filter display panel 200 and the thin film transistor display panel 100 by a spacer 350.

The color filter display panel 200 includes a light blocking member, called as black matrix on a second substrate 210. In one embodiment, the second substrate 210 is formed with transparent glass and the like. The light blocking member 220 is formed with a metal like chromium or an organic material. The light blocking member 220 includes a plurality of opening areas 221 exposing the second substrate 210.

One opening area 221 of the light blocking member 220 corresponds to one pixel, the first opening area 221a, the second opening area 221b, and the third opening area 221c of the light blocking member 220 respectively correspond to the first pixel electrode 190a, the second pixel electrode 190b, and the third pixel electrode 190c.

A color filter 230 is formed, partially overlapping the light blocking member 220 on the substrate 210, and the color filter 230 is disposed to be almost inserted into the opening area 221 defined by the light blocking member 220. Each color filter 230 may represent one of three primary colors, red, green, and blue. The color filters 230 arranged in a column direction may represent the same color.

A protection member 330 formed with an organic material is formed on the color filter 230. The protection member 330 prevents the color filter 230 from being exposed to protect the color filter 230 from an etching solution of the common electrode 270.

On the protection member 330, the common electrode is formed with a transparent conductive material such as ITO or IZO. The common electrode 270 receives the common voltage and includes the cut-out portions 271a, 272a, 273a, 271b, 272b, 273b, 271c, 272c, and 273c, and the spacer 350 formed with the same material of the protection member 330 is formed on the protection member 330. The spacer 350 is formed to maintain the gap between the color filter display panel 200 and the thin film transistor display panel 100.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 121: gate line | 131: sustain electrode |
| 140: gate insulating layer | 171: data line |
| 177: overlapping electrode | 190: pixel electrode |
| 220: light blocking member | 230: color filter |
| 270: common electrode | 330: protection member |
| 350: spacer | |

What is claimed is:

1. A liquid crystal display (LCD) comprising:
   a first substrate;
   first, second, and third gate lines extending along a first direction, formed over the first substrate and being parallel with each other;
   data lines insulated from the first gate line, the second gate line, and the third gate line and extending along a second direction that intersects the first direction;
   first, second, and third thin film transistors connected with the first gate lines, the second gate line, the third gate line, respectively, and connected with the data lines;
   a passivation layer covering the first thin film transistor, the second thin film transistor, and the third thin film transistor; and
   first, second, and third pixel electrodes formed over the passivation layer and connected with the first thin film transistor, the second thin film transistor, and the third thin film transistor, respectively,
   wherein the first gate line extends through a middle portion of the second pixel electrode along the first direction.

2. The LCD of claim 1, further comprising at least a storage electrode line formed on the same layer where the first, second, and third gate lines are formed.

3. The LCD of claim 1, wherein the first gate line, the second gate line, and the third gate line are sequentially arranged along the second direction, and the first gate line, the second gate line, and the third gate line form one gate line group.

4. The LCD of claim 3, wherein the at least a storage electrode line comprises:
   a first storage electrode line disposed between a third gate line of a previous gate line group and the first gate line of the present gate line group;

a second storage electrode line disposed between the first gate line and the second line of the present gate line group; and a third storage electrode line disposed between the second gate line and the third gate line of the present gate line group.

5. The LCD of claim 4, wherein the first thin film transistor is disposed between the first storage electrode line and the first gate line, the second thin film transistor is disposed between the second storage electrode line and the second gate line, and the third thin film transistor is disposed between the third storage electrode line and the third gate line.

6. The LCD of claim 4, wherein the first storage electrode line, the second storage electrode line, and the third storage electrode line are sequentially arranged in the second direction, and the first storage electrode line, the second storage electrode line, and the third storage electrode line form one storage electrode line group.

7. The LCD of claim 6, wherein the first pixel electrode is disposed between a third storage electrode line of a previous storage electrode line group and a first storage electrode line of the present storage electrode line group, the second pixel is disposed between the first storage electrode line and the second storage electrode line of the present storage electrode line group, and the third pixel electrode is disposed between the second storage electrode line and the third storage electrode line of the present storage electrode line group.

8. The LCD of claim 6, wherein each of the first pixel electrode, the second pixel electrode, and the third pixel electrode comprises a plurality of sub-pixel electrodes.

9. The LCD of claim 8, wherein the at least a storage electrode line comprises at least one extended storage portion disposed between two neighboring sub-pixel electrodes.

10. The LCD of claim 8, further comprising at least one overlapping electrode formed in the same layer of the data line and overlapping the at least a storage electrode line.

11. The LCD of claim 10, wherein the at least one overlapping electrode comprises at least one extended overlapping portion disposed between two neighboring sub-pixel electrodes.

12. The LCD of claim 10, wherein the first thin film transistor comprises a first gate electrode connected with the first gate line, a first source electrode connected with the data line, and a first drain electrode connected with the first pixel electrode, wherein the second thin film transistor comprises a second gate electrode connected with the second gate line, a second source electrode connected with the data line, and a second drain electrode connected with the second pixel electrode, and wherein the third thin film transistor comprises a third gate electrode connected with the third gate line, a third source electrode connected with the data line, and a third drain electrode connected with the third pixel electrode.

13. The LCD of claim 10, wherein the at least one overlapping electrode comprises:

a first overlapping electrode connected with the first drain electrode;

a second overlapping electrode connected with the second drain electrode; and a third overlapping electrode connected with the third drain electrode, and the first overlapping electrode, the second overlapping electrode, and the third overlapping electrode are separated from each other.

14. The LCD of claim 2, further comprising a gate insulating layer covering the gate line and the storage electrode line, and wherein the passivation layer comprises an organic layer.

15. The LCD of claim 1, further comprising a color filter display panel comprising a second substrate arranged opposite to the first substrate and a common electrode formed over the second substrate, and a liquid crystal layer disposed between the pixel electrodes and the color filter display panel.

16. The LCD of claim 1, wherein the first direction is perpendicular to the second direction.

* * * * *